(12) United States Patent
Anderson et al.

(10) Patent No.: US 9,286,932 B2
(45) Date of Patent: Mar. 15, 2016

(54) HARD DISK DRIVE HAVING REGIONS CORRESPONDING TO DIFFERENT SPEEDS AT WHICH STORAGE SURFACE ROTATES

(75) Inventors: Eric A. Anderson, Palo Alto, CA (US); Arif A. Merchant, Los Altos, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 13/259,202

(22) PCT Filed: Oct. 30, 2009

(86) PCT No.: PCT/US2009/062817
§ 371 (c)(1),
(2), (4) Date: Sep. 23, 2011

(87) PCT Pub. No.: WO2011/053316
PCT Pub. Date: May 5, 2011

(65) Prior Publication Data
US 2012/0014015 A1 Jan. 19, 2012

(51) Int. Cl.
*G11B 5/02* (2006.01)
*G11B 19/26* (2006.01)
*G11B 5/012* (2006.01)
*G11B 20/12* (2006.01)

(52) U.S. Cl.
CPC .............. *G11B 19/26* (2013.01); *G11B 5/012* (2013.01); *G11B 20/1258* (2013.01); *G11B 2020/1242* (2013.01); *G11B 2220/2516* (2013.01)

(58) Field of Classification Search
None
See application file for complete search history.

(56) References Cited

U.S. PATENT DOCUMENTS

| | | | |
|---|---|---|---|
| 4,514,771 A * | 4/1985 | Stark et al. | 360/73.03 |
| 5,175,654 A * | 12/1992 | Saito et al. | 360/51 |
| 5,185,682 A * | 2/1993 | Takahashi | 360/78.04 |
| 5,189,571 A * | 2/1993 | Murphy et al. | 360/75 |
| 5,708,649 A * | 1/1998 | Kamoto et al. | 369/47.19 |
| 5,729,513 A * | 3/1998 | Akahira et al. | 369/47.4 |
| 5,764,430 A * | 6/1998 | Ottesen et al. | 360/73.03 |
| 5,787,292 A * | 7/1998 | Ottesen et al. | 360/73.03 |
| 5,808,995 A | 9/1998 | Nakamura et al. | |
| 5,926,453 A * | 7/1999 | Muramatsu et al. | 369/275.4 |
| 6,021,015 A | 2/2000 | Jeffrey et al. | |
| 6,088,314 A * | 7/2000 | Tachibana et al. | 360/73.03 |
| 6,104,566 A | 8/2000 | Stephenson | |
| 6,137,644 A * | 10/2000 | Hetzler et al. | 360/48 |
| 6,621,592 B1 | 9/2003 | Takayama et al. | |
| 6,690,538 B1 * | 2/2004 | Saito et al. | 360/78.08 |
| 6,952,386 B1 | 10/2005 | Mahr | |
| 6,987,716 B2 | 1/2006 | Obinata et al. | |

(Continued)

OTHER PUBLICATIONS

"Victor 9000/Sirius S1" computer information, www.old-computers.com, computer released 1982, 3 Pages.

(Continued)

*Primary Examiner* — Thang Tran
(74) *Attorney, Agent, or Firm* — Michael A. Dryja

(57) ABSTRACT

A hard disk drive includes a storage surface, a motor, a read/write had, and a number of regions into which the storage surface is divisible. Data is writable to and data is readable from the storage surface. The motor is to rotate the storage surface at a variable speed. The read/write head is to write data to and read data from the storage surface while the storage surface is rotated by the motor. Each region corresponds to a different speed at which the storage surface is rotated for the read/write head to write data to and read data from the region.

8 Claims, 3 Drawing Sheets

(56) References Cited

U.S. PATENT DOCUMENTS

| | | | |
|---|---|---|---|
| 2001/0043530 A1* | 11/2001 | Nakatsuka et al. | 360/73.03 |
| 2002/0064110 A1* | 5/2002 | Sato | 369/47.39 |
| 2005/0174905 A1 | 8/2005 | Okajima et al. | |
| 2007/0104460 A1* | 5/2007 | Nagai et al. | 386/95 |
| 2007/0188908 A1 | 8/2007 | Kurita et al. | |
| 2008/0130153 A1* | 6/2008 | Lee et al. | 360/48 |
| 2010/0053795 A1* | 3/2010 | Kudo et al. | 360/73.03 |

OTHER PUBLICATIONS

A. Shilov, "Hitachi unveils energy-efficient hard drive with variable spindle speed," www.xbitlabs.com, Oct. 22, 2007, 2 Pages.

International Searching Authority, The International Search Report and the Written Opinion, Jul. 28, 2010, 10 Pages.

J. Wong, "Technology Innovation for eco-friendly HDDs," Hitachi white paper. Oct. 2007, 3 Pages.

* cited by examiner

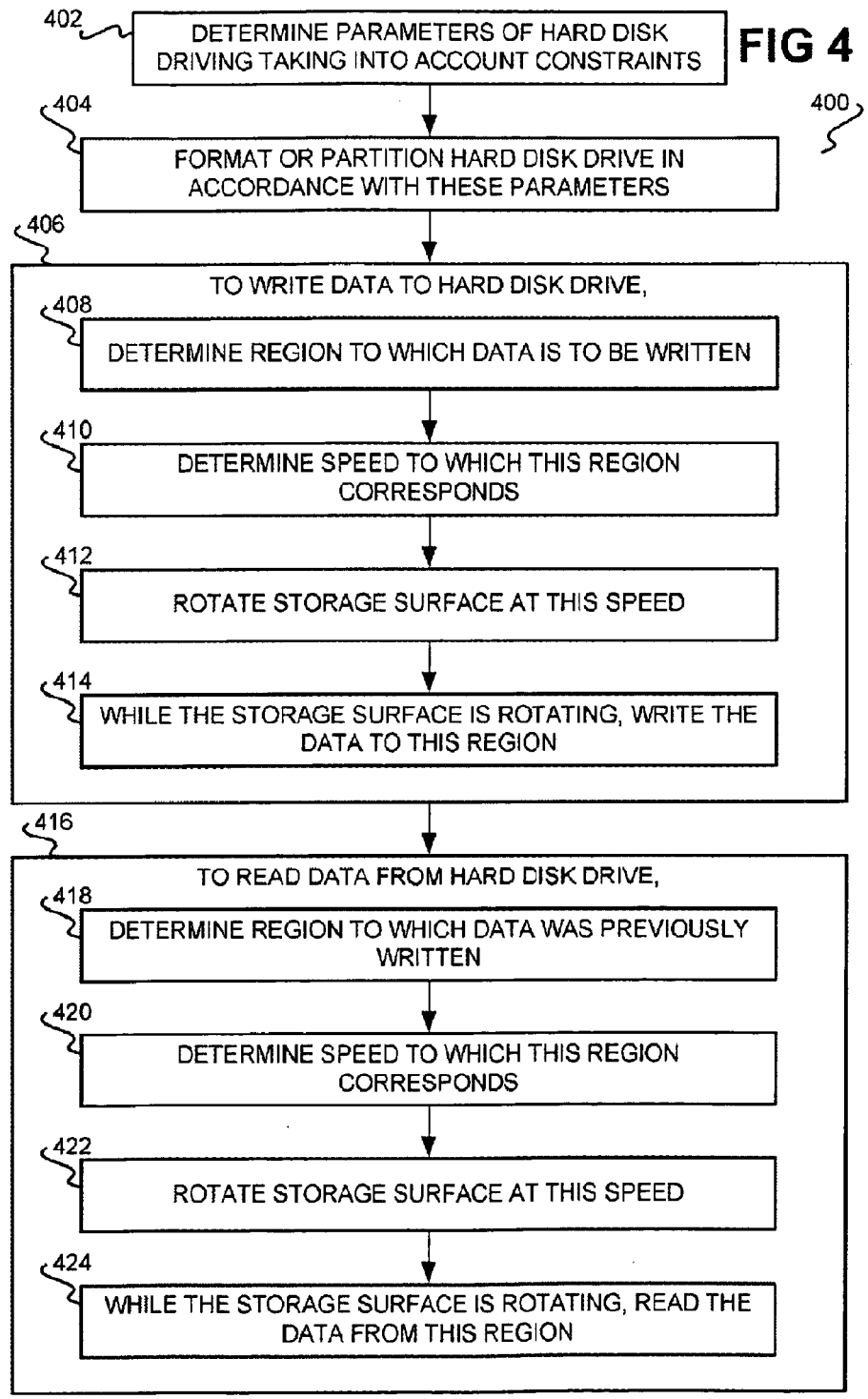

HARD DISK DRIVE HAVING REGIONS CORRESPONDING TO DIFFERENT SPEEDS AT WHICH STORAGE SURFACE ROTATES

BACKGROUND

A paramount part of any type of computing system is the storage of data. One popular way to store data in a non-volatile manner—i.e., such that the data remains stored even when power is removed from the computing system—is to employ a hard disk drive. A hard disk drive is an economical choice to store large amounts of data, and is virtually omnipresent in computing systems. Within a hard disk drive, data is magnetically stored on one or more storage surfaces, or platters, of the drive.

BRIEF DESCRIPTION OF THE DRAWINGS

FIG. 4 is a flowchart of a method, according to an embodiment of the present disclosure.

DETAILED DESCRIPTION

Figure 1:
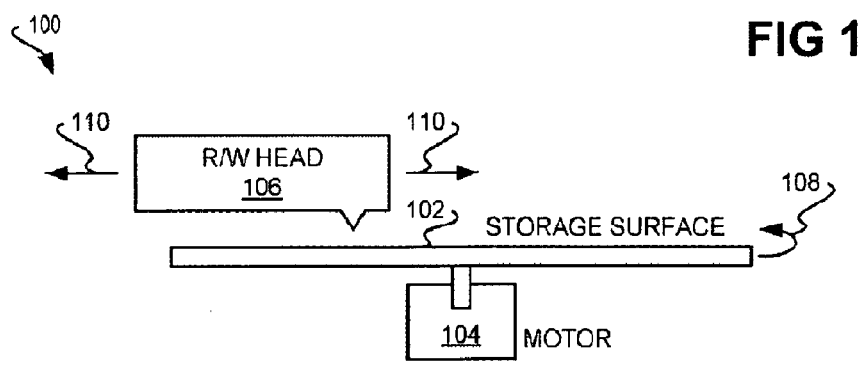
FIG. 1 is a diagram of a hard disk drive, according to an embodiment of the present disclosure.

As noted in the background, virtually all computing systems use hard disk drives to store data in a non-volatile manner. For improved performance, manufacturers have developed hard disk drives that have their storage surfaces rotated at increasingly higher speeds. For example, within desktop computing environments, 5,400 rotations-per-minute (RPM) hard disk drives have increasingly been replaced by 7,200 RPM drives. Within server computing environments, 10,000 RPM hard disk drives have increasingly been replaced by 12,000 RPM and 15,000 RPM drives.

Unfortunately, hard disk drives that spin their storage surfaces at higher rotational speeds consume significantly more power than hard disk drives that spin their storage surfaces at lower rotational speeds. In general, the amount of power used by a hard disk drive is roughly proportional to the cube of the drive's rotational speed. Thus, while a 7,200 RPM hard disk drive spins 33% faster than a 5,400 RPM hard disk drive does, it consumes more than 137% more power than a 5,400 RPM drive does. Likewise, while a 15,000 RPM drive spins 50% faster than a 10,000 RPM hard disk drive does, it consumes more than 237% more power than a 10,000 RPM drive does.

As such, employing faster hard disk drives to achieve better performance is antithetical to conserving power within a computing system. A hypothetical solution to this problem that has been proposed is to have a variable-speed hard disk drive, in which the storage surfaces of the drive are rotated at speeds commensurate with desired performance and power consumption objectives. However, such a hypothetical hard disk drive is in fact presently impossible to achieve in reality. This is because present hard disk drive technology imposes the constraint that if data is written to a storage surface of a hard disk drive while rotating at a given speed, the data has to be read from the surface while rotating at the exact same speed, and not at a lower or a higher speed.

The inventors have developed an approach that provides for a variable-speed hard disk drive while satisfying this constraint. The storage surface of a hard disk drive is divided into a number of regions. Each region corresponds to a different speed at which the storage surface is rotated for data to be written to and read from the region. As such, for a given region of the storage surface, the storage surface of the hard disk drive is rotated at the same speed while data is being written to the region and while data is being read from the region. However, different regions of the storage surface are accessed while the disk is rotated at different speeds.

Therefore, the storage surface of the inventive hard disk drive is rotated at a speed commensurate with desired performance and power consumption objectives, as to different regions of the storage surface. If data is written to a region of the storage surface that corresponds to a given rotational speed, then the data has to be read from at this same rotational speed. With this constraint taken into account, models can be developed to determine the number, size, and rotational speed of the regions of a hard disk drive, based on characteristics of the data expected to be stored on the hard disk drive, and based on desired performance and power consumption objectives.

FIG. 1 shows a representative hard disk drive 100, according to an embodiment of the disclosure. The hard disk drive 100 includes a storage surface 102, a motor 104, and a read/write head 106. Those of ordinary skill within the art can appreciate that the hard disk drive 100 can and typically does include other components, in addition to those depicted in FIG. 1. The storage surface 102 may also be referred to as a platter. While one storage surface 102 is depicted in FIG. 1, in actuality there can and will likely be more than one storage surface 102 in a typical hard disk drive.

Data is magnetically written to and read from the storage surface 102 by the read/write head 106, while the storage surface 102 is rotated as indicated by the arrow 108. The read/write head 106 is able to move radially across the storage surface 102 as indicated by the arrows 110. The motor 104 rotates the storage surface 102. The motor 104 can rotate the storage surface 102 at a variable speed. That is, the motor 104 can rotate the storage surface 102 at any of a number of different speeds, either within a continuous range, such as any speed from X to Y RPM, or within a discrete range, such as any speed from X to Y RPM in Z RPM increments.

Figure 2:
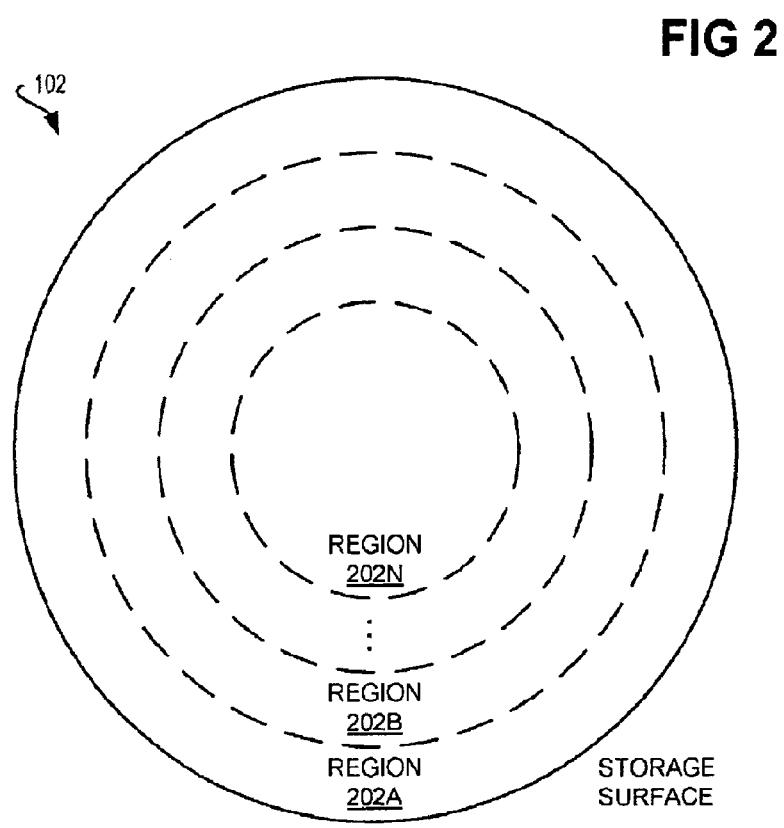
FIG. 2 is a diagram of a storage surface of a hard disk drive, according to an embodiment of the present disclosure.

FIG. 2 shows the storage surface 102 in detail, according to an embodiment of the disclosure. The storage surface 102 has been divided into a number of arbitrary regions 202A, 202B, . . . , 202N, collectively referred to as the regions 202. Each region 202 corresponds to a different speed at which the storage surface 102 is rotated for the read/write head 106 to write data to and read data from the region 202. There are at least two regions 202. In an embodiment in which the storage surface 102 has a number of concentric tracks, each track is wholly within a given region. As such, the maximum number of regions 202 in this embodiment is the number of concentric tracks of the storage surface 102.

As has been noted above, all data written to a given region 202 while the storage surface 102 is rotated at a particular speed can only be read from the given region 202 while the storage surface 102 is rotated at this particular speed, and not at any other speed. Each region 202 thus corresponds to a different rotational speed at which the storage surface 102 is rotated for data to be written to and read from the region. The different rotational, or angular, speeds to which the regions 202 correspond are independent of the linear speeds of the storage surface 102.

In one embodiment, the outer region 202A corresponds to the fastest speed at which the storage surface 102 is rotated for data to be written to and read from the surface 102. In this embodiment, the inner region 202N corresponds to the slowest speed at which the storage surface 102 is rotated for data to be written to and read from the surface 102. Therefore, in this embodiment, the regions 202 correspond to different speeds in a decreasing manner from the outer region 202A to the inner region 202N.

The boundaries between the regions 202 of the storage surface 102, which are denoted by dotted lines in FIG. 2, are defined at the time that the hard disk drive 100 is formatted or partitioned, and may be later changed or altered, such that the boundaries are variable or dynamic. For example, at first there may be three regions 202, where each region 202 is able to store the same amount of data. Thereafter, the regions 202 may be modified so that one region 202 is able to store twice the amount of data of each of the other two regions 202. Thereafter again, the regions 202 may be altered so that there are four regions 202, or two regions 202.

In one embodiment, for a given physical size of a region 202, the region 202 has the same number of disk sectors—i.e., the region 202 is able to store the same amount of data— regardless of the speed to which the region 202 corresponds. However, in another embodiment, for a given physical size of a region 202, the region 202 has a number of desk sectors that is inversely related to the speed to which the region 202 corresponds. Stated another way, for the same physical size of two regions 202, the first region 202 has a greater number of disk sectors as compared to the second region 202, where the first region 202 corresponds to a slower speed as compared to the second region 202.

Therefore, because some types of operating systems of computing devices may require that the disk sectors of the hard disk drive 100 be sequentially numbered from the outer circumference to the inner circumference of the storage surface 102, the disk sectors may be initially numbered as if all the regions 202 correspond to the lowest speed. Thereafter, depending on the actual speed to which each region 202 corresponds, a number of disk sectors of each region 202 may be reserved for future use, if that region 202, for instance, later has its corresponding speed lowered. For example, at the lowest speed a given region 202 may use all H disk sectors, whereas at a current higher speed this region 202 may use just H-G disk sectors. Therefore, although the disk sectors of the region 202 are numbered from J to J+H-1, G disk sectors (e.g., disk sectors J+H-G to J+H-1) are reserved for future use, should the speed to which the given region 202 corresponds be subsequently lowered. These G disk sectors are thus not used at the current actual speed to which the region 202 corresponds.

Figure 3:
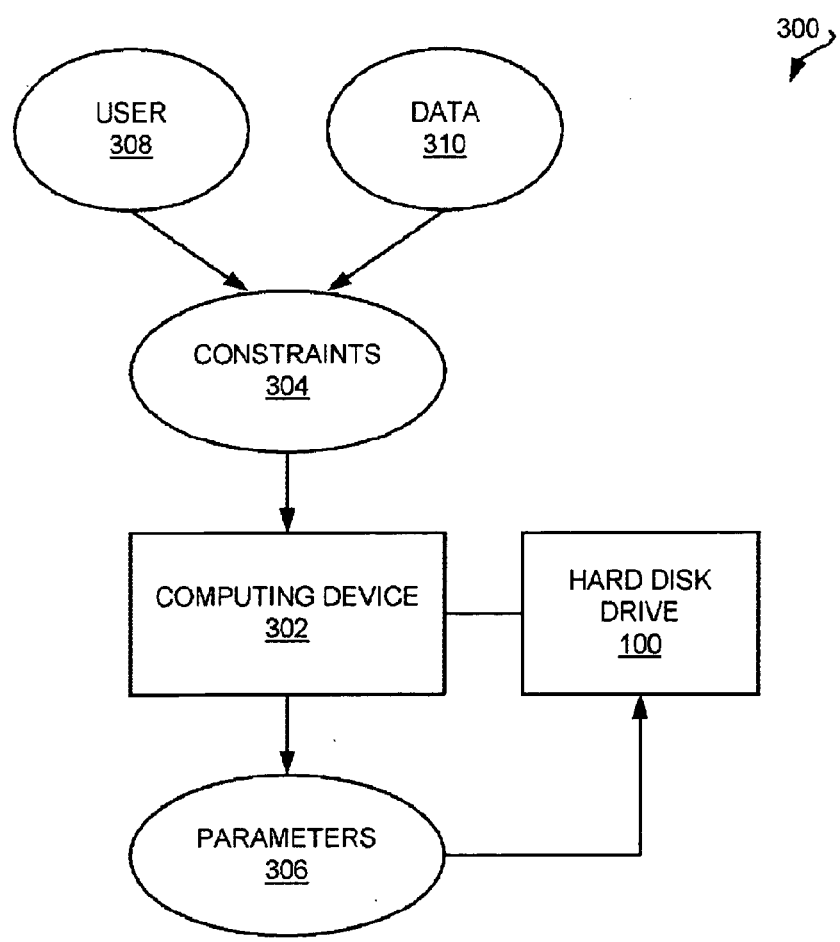
FIG. 3 is a diagram of a system, according to an embodiment of the present disclosure.

FIG. 3 shows a system 300, according to an embodiment of the disclosure. The system 300 includes a computing device 302 and the hard disk drive 100, the latter to which the computing device 20 is communicatively connected. The computing device 302 may be a computer or another type of computing device, which typically includes one or more processors, memory, and so on. The hard disk drive 100 may be internal to the computing device 302 or external to the computing device 302. In one embodiment, the computing device 302 may be part of the hard disk drive 100, such as the controller of the hard disk drive 100. The computing device 302 writes data to and reads data from the regions 202 of the storage surface 102 of the hard disk drive 100.

The computing device 302 specifies one or more parameters 306 of the hard disk drive 100, in accordance with which the hard disk drive 100 is formatted or partitioned into the different regions 202. The parameters 306 can include one or more of the following. The first parameter is the number of regions 202 into which the storage surface 102 of the hard disk drive 100 is to be divided. The second parameter is the size of each region 202, where different regions 202 can have different sizes, and where the size of a given region 202 is the amount of data that can be stored on the region 202. The third parameter is the speed at which the storage surface 102 is to be rotated while data is written to and read from each region 202, where different regions 202 can correspond to different speeds.

The computing device 302 specifies the parameters 306 particularly by optimizing the parameters 306, while taking into account one or more constraints 304. The constraints 304 can include constraints 304 that are specified by a user 308, as well as constraints 304 that result from data 310 that is expected to be stored on the hard disk drive 100. The data 310 may be divided, for instance, into a number of different data types, which correspond to data of different kinds. The computing device 302 optimizes the parameters 306 while taking into account the constraints 304 by using a model or an algorithm, by solving a linear programming problem, or by following a different approach.

The constraints 304 that are specified by the user 308 can include the desired power consumption by the hard disk drive 100. The constraints 304 that are specified by the user 308 and that also result from the data 310 expected to be stored on the hard disk drive 100 can include one or more of the following. The first such constraint is the desired performance in writing each different type of data to and/or reading each different type of data from the hard disk drive 100. The second such constraint is the expected amount of each different type of data to be written to the hard disk drive 100. The third such constraint is the expected frequency at which each different type of data is read from the hard disk drive 100 after having been written to the drive 100.

For example, a first type of data may be archival data that after being written to the hard disk drive 100, is not expected to be read from the drive 100 often. Therefore, the desired performance of accessing such data (i.e., reading or writing such data) may not be specified, or may be specified as being permitted to be relatively low. There may be a large amount of such data.

As another example, a second type of data may be data that is frequently used, and thus after being written to the hard disk drive 100, is expected to be read from (and updated on) the drive 100 often. Therefore, the desired performance of accessing such data (i.e., reading or writing such data) may be specified as high. There may not be a large amount of such data, however.

The computing device 302 takes into account all these constraints 304 in deciding upon the parameters 306 in accordance with which the hard disk drive 100 is initially formatted or partitioned. For example, as to the two types of data described in the previous two paragraphs, the user may request that overall power consumption by the hard disk drive 100 be no greater than a given level. As such, the computing device 302 is to determine the parameters 306 to maximize the performance in accessing the second type of data, while being permitted to minimize the performance in accessing the first type of data as much as possible to ensure this specified power consumption level. The computing device 302 may further determine the sizes of the regions 202 so that there is sufficient space for each region 202 to store each of the two types of data.

When determining whether the hard disk drive 100 will satisfy a specified performance level, an additional constraint the computing device 302 may take into account is the performance penalty that is incurred when the hard disk drive changes speed to access data from a given region 202 after having accessed data from another region 202 corresponding to a different speed. This additional constraint may, for instance, result in the computing device 302 determining a lower number of regions 202 than the device 302 otherwise would if this constraint were not imposed. Such an additional constraint may be realized by employing a Markov Chain model of the expected access patterns of the data of all the various types to be stored on the hard disk drive 100.

As has been noted above, the regions 202 of the storage surface 102 of the hard disk drive 100 may be variably defined. As such, the computing device 302 may modify the boundaries among the regions 202 after the initial formatting or partitioning of the hard disk drive 100, during a subsequent reformatting or repartitioning of the drive 100. For example, a first region 202 may initially be physically larger in size than a second region 202, whereas after reformatting or repartitioning, the first region 202 may subsequently be physically smaller in size than the second region 202.

As has also been noted above, the computing device 302 may initially number the disk sectors for all the regions 202 of the storage surface 102 of the hard disk drive 100 as if each region 202 corresponds to the lowest speed at which the surface 102 is rotated for data to be written to and read from the drive 100. As such, for those regions 202 corresponding to speeds higher than this lowest speed, not all the disk sectors will be used. Rather, some disk sectors will be reserved, in case one of these regions 202 is later redefined to correspond to a lower speed. This situation results in the case where, for a given physical size of a region 202, the region 202 has a number of disk sectors that is inversely related to the speed to which the region 202 corresponds.

In conclusion, FIG. 4 shows a method 400, according to an embodiment of the disclosure. The parameters 306 of the hard disk drive 100 are determined while taking into account the constraints 304 (402), as has been described. The hard disk drive 100 is then formatted or partitioned in accordance with the parameters 306 (404). Parts 402 and 404 of the method 400 can be periodically reperformed, particularly when the workload of the hard disk drive 100 changes, such as when the types and/or the amount of data to be stored on the hard disk drive 100 changes. In such instance, the regions 202 are variably defined, insofar as the boundaries among the regions 202 can be altered.

Data is written to the hard disk drive 100 (406) as follows. The region 202 on the storage surface 102 of the hard disk drive 100 to which the data is to be written is determined (408). For example, based on the type of the data, the region 202 to which the data should be written can be looked up in a previously constructed lookup table, either by the computing device 302 or by the hard disk drive 100. The speed to which this region 202 corresponds is also determined (410). The speed can also be looked up in the same or different previously constructed lookup table. The storage surface 102 of the hard disk drive 100 is then rotated at this speed (412), and while the storage surface 102 is rotating at this speed, the data is written to the region 202 in question (414).

The lookup table or tables that are used can be stored in non-volatile or volatile semiconductor memory of the hard disk drive 100. In the latter case, the lookup table or tables may be backed up to a fixed location on the storage surface 102 of the hard disk drive 100. When the hard disk drive 100 is first turned on, the lookup table or tables are then copied to volatile semiconductor memory. Periodically, the lookup table or tables may be copied to the fixed location on the storage surface 102, such as at least when the hard disk drive 100 is being turned off.

Data is read from the hard disk drive 100 (416) as follows. The region 202 on the storage surface 102 of the hard disk drive 100 to which the data was previously written is determined (418). For example, the request to read the data may specify a disk sector, which can be correlated to the region 202 that includes this disk sector, either by the computing device 302 or by the hard disk drive 100. The speed to which this region 202 corresponds is also determined (420). The speed can be looked up in a previously constructed lookup table, such as the lookup table that is employed in part 410 of the method 400. The storage surface 102 of the hard disk drive 100 is then rotated at this speed (422), and while the storage surface 102 is rotating at this speed, the data is read from the region 202 in question (424).

We claim:

1. A system comprising:
    a hard disk drive comprising a storage surface divisible into a plurality of regions, each region corresponding to a different speed at which the storage surface is rotated while data is written to and read from the region; and,
    a computing device to write data to and read data from the regions of the storage surface of the hard disk drive,
    wherein the computing device is to variably define boundaries among the regions, such that at a first time a first region has a larger physical size than a second region, and such that at a second time the first region has a smaller physical size than the second region.

2. The system of claim 1, wherein the computing device is to specify one or more parameters of the hard disk, drive, the parameters comprising one or more of:
    a number of the regions into which the storage surface is to be divided;
    a size of each region; and,
    a speed at which the storage surface is to be rotated while data is written to and read from each region.

3. The system of claim 2, wherein the computing device is to specify the parameters of the hard disk drive by optimizing the parameters taking into account one or more constraints, the constraints comprising one or more of:
    an expected amount of each of a plurality of different types of data to be written to the hard disk drive;
    an expected frequency of reading each different type of data after having been written to the hard disk drive;
    a desired performance in writing each different type of data to and/or reading each different type of data from the hard disk drive; and,
    a desired power consumption by the hard disk drive.

4. The system of claim 3, wherein the computing device is to optimize the parameters further taking into account a performance penalty incurred when the hard disk drive changes speed to access data from a first given region after having accessed data from a second given region.

5. A system comprising:
    a hard disk drive comprising a storage surface divisible into a plurality of regions, each region corresponding to a different speed at which the storage surface is rotated while data is written to and read from the region; and,
    a computing device to write data to and read data from the regions of the storage surface of the hard disk drive,
    wherein the computing device is to sequentially number a plurality of sectors within a given region as if the given region corresponds to a slowest speed, regardless of a speed to which the given region actually corresponds,
    wherein for a particular physical size of the given region, the given region has a greater number of disk sectors that data can actually be written to and read from when the given region corresponds to a slower speed as compared to when the given region corresponds to, a faster speed, and wherein not all the numbered sectors of the given region are usable except when the given region corresponds to the slowest speed.

6. The system of claim 5, wherein the computing device is to specify one or more parameters of the hard disk drive, the parameters comprising one or more of:
   a number of the regions into which the storage surface is to be divided;
   a size of each region; and,
   a speed at which the storage surface is to be rotated while data is written to and read from each region.

7. The system of claim 6, wherein the computing device is to specify the parameters of the hard disk drive by optimizing the parameters taking into account one or more constraints, the constraints comprising one or more of:
   an expected amount of each of a plurality of different types of data to be written to the hard disk drive;
   an expected frequency of reading each different type of data after having been written to the hard disk drive;
   a desired performance in writing each different type of data to and/or reading each different type of data from the hard disk drive; and,
   a desired power consumption by the hard disk drive.

8. The system of claim 7, wherein the computing device is to optimize the parameters further taking into account a performance penalty incurred when the hard disk drive changes speed to access data from a first given region after having accessed data from a second given region.

* * * * *